June 14, 1966  R. H. SOTO  3,255,923
DISPOSABLE LIQUID STORAGE AND DISPENSING DEVICE
Filed Feb. 3, 1964  3 Sheets-Sheet 1

INVENTOR:
RICARDO HURTADO SOTO
BY
Dawson, Tilton, Fallon, Lungmus & Alexander
ATT'YS June 14, 1966 R. H. SOTO 3,255,923
DISPOSABLE LIQUID STORAGE AND DISPENSING DEVICE
Filed Feb. 3, 1964 3 Sheets-Sheet 2
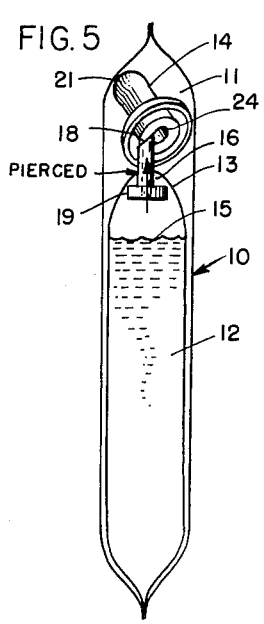
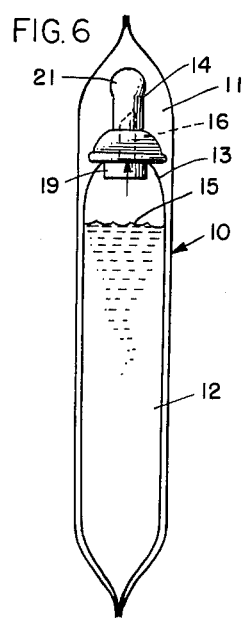
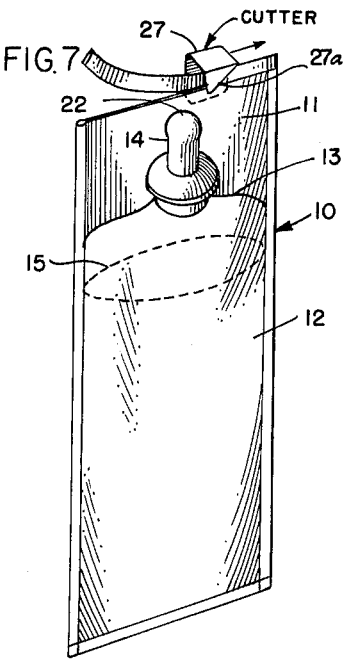
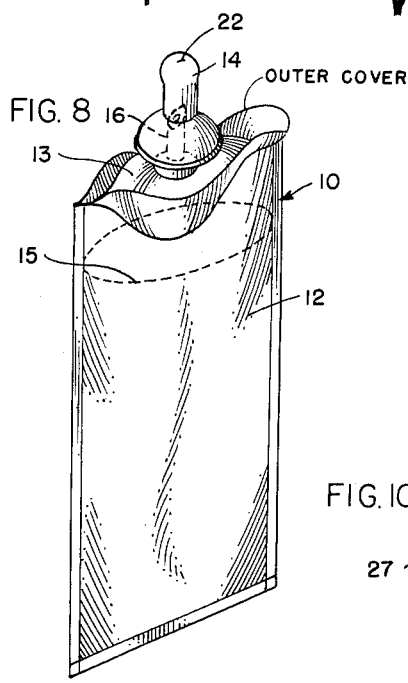
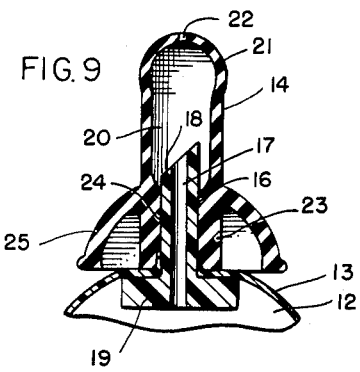
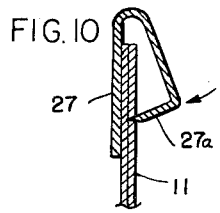
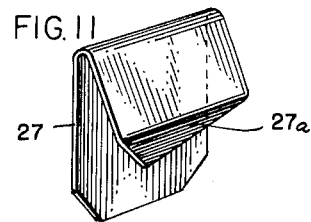
INVENTOR:
RICARDO HURTADO SOTO
BY
Dawson, Tilton, Fallon, Lungmus & Alexander
ATT'YS

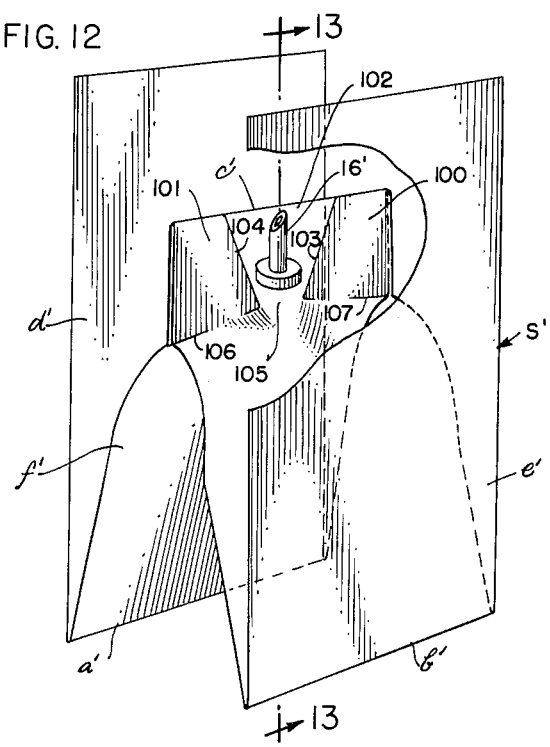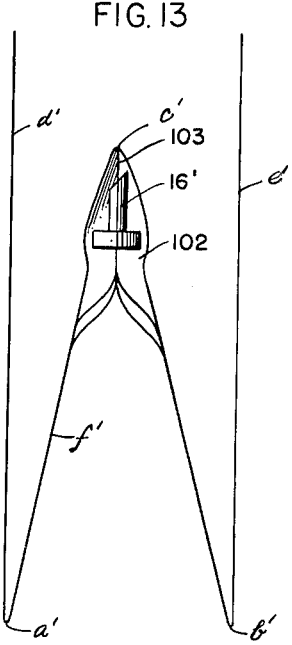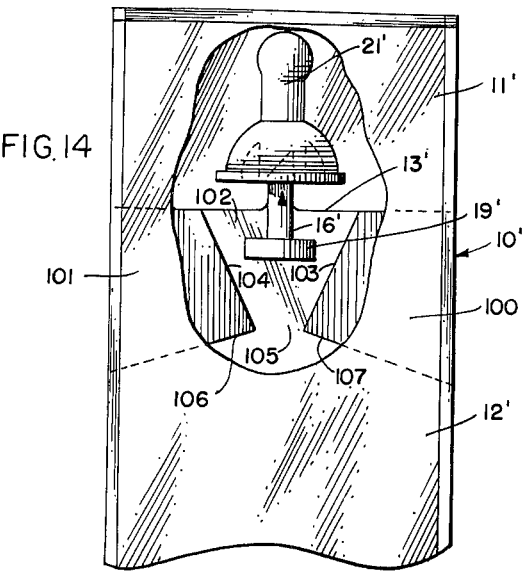

United States Patent Office 3,255,923
Patented June 14, 1966

3,255,923
DISPOSABLE LIQUID STORAGE AND
DISPENSING DEVICE
Ricardo Hurtado Soto, Suba-Bogata, Colombia, assignor to Lacto-Seal, Inc., Indianapolis, Ind., a corporation of Delaware
Filed Feb. 3, 1964, Ser. No. 341,871
9 Claims. (Cl. 222—80)

This invention relates to a disposable liquid storage and dispensing device. The device of this invention has particular utility as a disposable nursing unit, although it can advantageously be applied for other purposes such as the storage and dispensing of intravenous solutions.

A principal object of the present invention is to provide a disposable liquid storage and dispensing device which is simple and inexpensive to manufacture, while at the same time providing for the storage and dispensing of the liquid under sanitary or sterile conditions. A related object is to provide a device of the character described which is mechanically simple in construction, and which can be prepared for dispensing very easily and rapidly, even by a relatively inexperienced person. Other objects and advantages will be indicated in the following detailed specification.

The constructon and operation of devices in accordance with the present invention are shown in the accompanying drawings, wherein.

FIGS. 5 to 8 illustrate steps in preparing the device to dispense the liquid; FIG. 5 being a side elevational view of the complete device, illustrating the first step in preparing the device for dispensing the liquid; FIG. 6 a side elevational view showing the next step in preparing the device for dispensing the liquid wherein the nipple and connector are in attached relation; FIG. 7 a perspective view illustrating the next step in preparing the device for dispensing; FIG. 8 is a perspective view showing the final preparatory step.

FIG. 9 is an enlarged detail sectional view of the assembled nipple and connector, with the pierced plastic wall clamped therebetween.

FIG. 10 is an enlarged side sectional view illustrating the assembly of the cutter and the nipple pouch end of the envelope.

FIG. 11 is an enlarged perspective view of the cutter.

FIG. 12 is a perspective view of a sheet of thermoplastic material being folded to form a pouch-providing envelope of modified construction.

FIG. 13 is a side sectional view taken on line 13—13 of FIG. 12.

FIG. 14 is a fragmentary front elevational view of the completed pouch illustrating particularly the modified construction wherein means are provided for retaining the connector in position for use.

Figure 4:
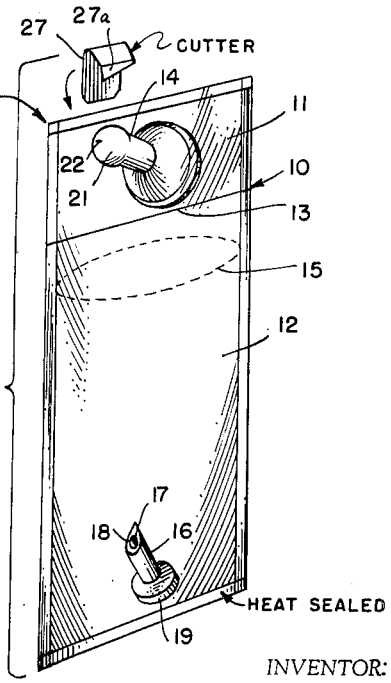
FIG. 4 is a perspective view showing the completely assembled device and including a cutter for opening the nipple-containing pouch.

Looking first at FIG. 4, which illustrates the dispensing device in its completed form as it would be distributed through the channels of commerce and prior to the use of the device for dispensing the liquid, it can be seen that the device comprises an envelope designated generally by the number 10 which provides two adjoining storage pouches 11 and 12. The envelope 10 and the storage pouches 11 and 12 are formed of flexible thermoplastic sheet material, such as polyethylene, vinyl chloride-acetate copolymers, rubber hydrochloride, vinylidene chloride, and the polyamides and various modifications of these resins as are well known for making desirable container film.

Figure 1:
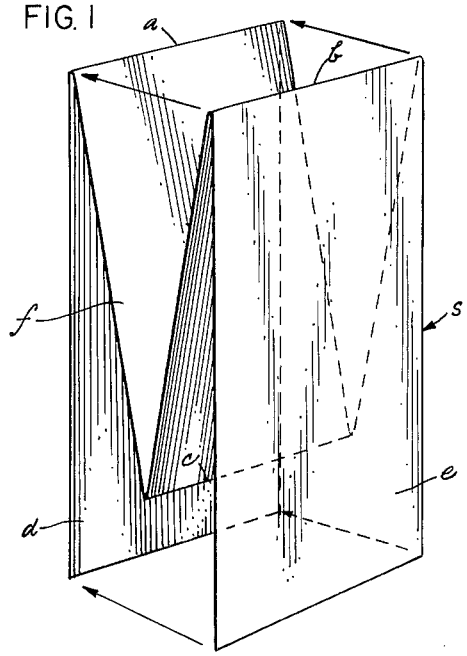
FIG. 1 is a perspective view of a sheet of thermoplastic material being folded to form a pouch-providing envelope.

The pouches 11 and 12 are separated by an inner wall, which is also formed of the flexible thermoplastic sheet material. The entire envelope means 10 including the internal wall 13 may be advantageously formed from an integral piece of said sheet material. The method of fabrication is illustrated particularly in FIG. 1, wherein the piece of material is designated generally by the letter S. As there shown, the sheet S is folded upon itself along lines a, b and c to provide an M-shaped configuration when viewed from the side or in cross section, as indicated in FIG. 1. The legs of the M, d and e, provide the outer sides of the envelope, while the V-shaped center portion f provides the wall 13 which separates the two compartments or pouches.

Figure 2:
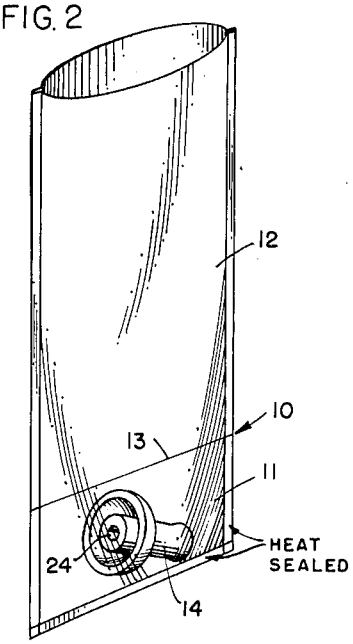
FIG. 2 illustrates a later step in the assembly of the envelope after a nipple has been inserted in one of the compartments.

The folded piece of material S is brought together as indicated by the arrows in FIG. 1, and the outer edge portions of the walls of the envelope are heat-sealed together. For example, the vertically-extending side edges would be first heat-sealed to define the pouches 11 and 12, separated by the wall 13, but having open outer ends. A dispensing means such as a nursing nipple 14 can then be inserted in the compartment 11 through its open outer end, and thereafter the outer edges of the sides of the compartment are brought together and heat-sealed to complete the enclosure of pouch 11, with the nipple 14 contained therein. The appearance of the device at this point in its assembly is illustrated in FIG. 2.

Figure 3:
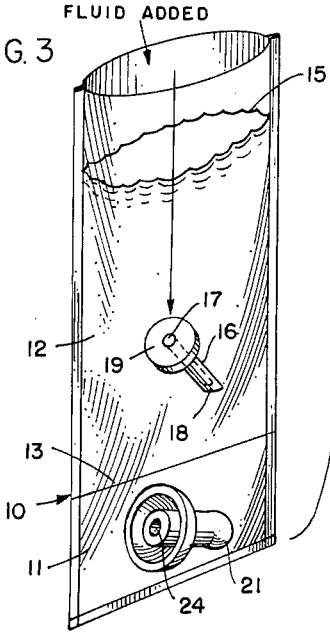
FIG. 3 illustrates a further stage in the assembly of the device wherein liquid has been introduced into the other pouch and a connector has also been inserted therein.

As the next step in the assembly, which is illustrated particularly by FIG. 3, a liquid such as a nursing formula 15 can be introduced into pouch 12 through its open upper end. A connector 16 is also introduced through the open upper end of the pouch. Thereafter, the side edges of the pouch adjacent the open mouth of pouch 12 are brought together and heat-sealed, thereby providing a hermetic seal for the liquid 15. In order to provide more conveniently for the manipulation of the pouch 12 and more particularly of the connector 16 therein, the pouch 12 will only be partially filled with the liquid, leaving some air space therein, as indicated in FIG. 4.

A cutter 17 may aslo be provided for cooperation with the outer free edge portion of pouch 11, as also indicated in FIG. 4. The cutter may be supplied separately or may be mounted on the free end of the pouch 11. The function of the cutter will subsequently be described in connection with the preparation of the device for dispensing the liquid.

The connector 16 is of tubular configuration and provides a passage 17 extending therethrough. One end portion 18 is pointed or scarfed to facilitate its use in piercing the wall 13, as will subsequently be described. The other end portion 19 is laterally enlarged to provide an outwardly-extending annular flange. The nipple 14 is also of tubular configuration, providing a passage 20 extending therethrough. One end of the nipple 14 provides a nursing tip 21, which includes the usual slit or perforation 22 through which the milk can be withdrawn by the baby. The other end of the nipple 14 is equipped with a socket-providing portion 23 which encloses a socket 24 that forms a continuation of passage 20, as shown more clearly in FIGS. 2, 3 and 9. The socket 24 is dimensioned to snugly receive the connector 16 in the manner shown in FIG. 9. The nipple 14 is also provided with an outwardly flared skirt portion 25 which encloses the socket-providing portion 23. The skirt 25 functions as the breast portion of the nipple during infant feeding, but it may be omitted, if desired.

OPERATION

The way in which the completed package is prepared for dispensing the liquid is illustrated more particularly in FIGS. 5–8. While the procedure employed may be varied, one advantageous procedure is to assemble the nipple 14 and the connector 16 while the nipple-containing pouch 11 remains sealed. To accomplish this, the connector 16 is manipulated to a position immediately adjacent the upper end portion of the wall 13, with the pointed end 18 of the connector pressing against the wall. With one hand holding the connector in this position, the other hand can be used to grasp the nipple through the walls of the pouch 11, and the nipple socket 24 can be forced over the connector tube 16 as the point 18 pierces the wall 17. Alternatively, the connector end 18 can be forced through the wall 13, and the nipple socket applied thereover, with the envelope in an upright position. This procedure is illustrated in FIGS. 5 and 6, the nipple socket 24 just being applied to the tip 18 in FIG. 5 and FIG. 6 illustrating the completion of the assembly step.

The assembled nipple 14 and connector 16 are shown more clearly in the cross-sectional view of FIG. 9. It will be observed that the connector tube 16 has been fully inserted in the socket 24, and that the wall 23 surrounding the pierced portion thereof is securely clamped between the annular flange 19 and the lower end of the socket-providing portion 23. This will permit the liquid to flow outwardly through the passage 17 into the nipple passage 20 without leakage around the pierced portion of the wall 13.

As the next step in the preparation of the device for dispensing the liquid, tthe upper end of pouch 11 is opened. While scissors or other means may be employed, it is convenient to utilize the cutter 17. The cutter is mounted on one corner of the outer end of pouch 11, and the pointed leg 17a thereof pressed into the thermoplastic material. As the cutter 17 is drawn along the free edge portion, the pouch 11 is opened, as illustrated in FIG. 7.

The walls of pouch 11 can then be pressed downwardly or folded back to expose the nipple 14, as illustrated in FIG. 8. The device is then ready for dispensing the liquid baby formula. When the feeding of the infant has been completed, the entire device can be discarded.

As will be appreciated from the foregoing description, one of the important advantages of the present invention is that the device may be prepared for dispensing the liquid while maintaining an aseptic or sterile condition of all the interior components. By following the sequence of steps described, the nursing unit may be prepared for dispensing in the condition of FIG. 8 without the direct handling of the connector 16, the nipple 14, or exposing the liquid formula 15 to non-sterile conditions. In hospital use, the unopened dispensing device can be given to the baby's mother, who will then perform the opening steps, thereby further protecting the baby against the possibility of exposure to foreign bacteria.

Various modifications of this invention will occur to those skilled in the art. For example, the pouches 11 and 12 can be formed as separate envelopes, although this will not usually be as advantageous as the specific construction described herein, especially when it is desired to form both of the pouches from an integral sheet of thermoplastic material. It will be apparent, however, that the pouch 12, with the connector 16 therein, would have utility as a liquid-dispensing means even if it is not utilized with another pouch 11 containing a dispensing means such as the nipple 14.

FIGURES 12 to 14 illustrate a modified construction wherein means is provided within the liquid-containing compartment of the envelope for retaining the tubular connector in a restricted area adjacent the wall separating the two compartments with the pointed end of the connector extending toward the wall. This arrangement will facilitate the manipulation of the connector, as will subsequently be explained.

Looking first at FIG. 12, there is shown a view similar to FIG. 1, wherein the corresponding parts have been given the same letters, except that the letters have been primed to indicate that they are applied to a modified construction. As with the embodiment of FIG. 1, the sheet S' is folded upon itself along lines a', b', c' to provide an M-shaped configuration as shown in FIGS. 12 and 13. The legs of the M, d' and e' provide the outer sides of the envelope, while the V-shaped center portion f' provide the wall 13', which separates the two pouches 11' and 12', shown more clearly in FIG. 14 wherein the parts corresponding to the embodiment previously described have been given the same numbers except that the numbers have been primed.

As a preliminary step in forming the package of FIGURES 12–13, the V-shaped center portion of the sheet S' is brought together on each side of the tubular connector 16', which has been inserted immediately below the center portion of fold c'. The areas of the plastic sheets on each side of connector 16' are heat-sealed as indicated at 100 and 101 to provide a pocket 102 within which the connector is retained. This pocket defined by the inside edges 103 and 104 of the heat-sealed areas 100 and 101. The edges 103 and 104 may converge toward the restricted throat and may converge to a narrow throat portion 105, which communicates with the liquid in compartment 12'. The throat portion 105 is dimensioned so that it is smaller in the cross section than the flange portion 19' of the connector, thereby retaining the connector within the pocket 102. The lower edges 106 and 107 of the heat sealed areas 100 and 101 may converge upwardly towards throat 105. This construction will assist in directing the liquid from compartment 12' into pocket 102 for outflow through the connector 19', after the connector has been extended through the wall 13', and united with the nipple 21'. This is illustrated particularly in FIG. 14. It will be understood that compartment 11' will be open after the nipple and connector have been united, as previously described with respect to the embodiment of FIGS. 4–8.

It is desired to protect this invention by claims which are not limited to the specific embodiments shown herein, which embodiments are to be taken as merely illustrative of the principles and features of the invention. Other modifications and embodiments of the present invention will readily occur to those skilled in the art.

I claim:
1. In a disposable liquid storage and dispensing device, the combination comprising envelope means formed of flexible thermoplastic sheet material and providing two adjoining storage pouches, said pouches being separated by a common pierceable wall of said sheet material extending therebetween, a liquid hermetically sealed in one of said compartments, dispensing means contained within the other of said compartments, said dispensing means having a dispensing end and a socket-providing end, and a passage-providing connector contained wtihin said liquid storage compartment, one end portion of said connector being pointed and dimensioned to be snugly received in said dispensing means socket end, said connector pointed end being manually maneuverable into contact with said common wall between said pouches for piercing the wall and engaging said dispensing means socket end preparatory to dispensing said liquid, said dispensing means remaining within its respective pouch while being engaged with said connector.

2. The combination of claim 1 wherein said envelope means, including said wall, is formed of an integral piece of said sheet material, said piece of sheet material being folded upon itself in an M-shaped cross section so that the legs of said M provide the outer sides of said envelope and the V-shaped center portion provides said wall, said outer walls being heat-sealed together around the outer edges thereof to complete the enclosure of said pouches.

3. In a disposable liquid storage and dispensing device, the combination comprising envelope means formed of flexible thermoplastic sheet material and providing two adjoining storage pouches, said pouches being separated by a wall of said sheet material, liquid baby formula partially filling one of said compartments and hermetically sealed therein, a detached nipple disposed within the other of said compartments and healed therein, said nipple having a feeding end portion and a socket-providing portion at the opposite end thereof, and a passage-providing connector disposed within said liquid storage compartment, one end portion of said connector being laterally enlarged and the other end portion being pointed and dimensioned to be snugly received in said nipple socket end portion, said connector pointed end being manually maneuverable into contact with said wall for piercing said wall and engaging said nipple socket end portion for dispensing said baby formula.

4. The combination of claim 3 wherein said envelope means, including said wall, is formed of an integral piece of said sheet material, said piece of sheet material being folded upon itself in an M-shaped cross section so that the legs of said M provide the outer sides of said envelope and the V-shaped center portion provides said wall, said outer walls being heat-sealed together around the outer edges thereof to complete the enclosure of said pouches.

5. In a disposable liquid storage and dispensing device, the combination comprising envelope means formed of an integral piece of flexible thermoplastic sheet material and providing two adjoining storage pouches separated by a common pierceable wall of said sheet material extending therebetween, liquid partially filling one of said compartments and hermetically sealed therein, detached passage-providing dispensing means contained within the other of said compartments and sealed therein, said dispensing means having a dispensing end and a socket-providing end, and a passage-providing tubular connector contained within said liquid storage compartment, one end portion of said connector providing an outwardly-extending annular flange and the other end portion of said connector being pointed, said connector pointed end being manually maneuverable for piercing said common wall between said pouches and engaging said dispensing means socket end with the immediately surrounding portions of said wall clamped between said flange and said socket, said dispensing means remaining within its respective pouch while being engaged with said connector.

6. The combination of claim 5 wherein the piece of said sheet material forming said envelope means is folded upon itself in an M-shaped cross section so that the legs of said M provide the outer sides of said envelope and the V-shaped center portion provides said wall, said outer walls being heat-sealed together around the outer edges thereof to complete the enclosure of said pouches.

7. The combination of claim 5 wherein there is also provided slitter means for opening said nipple pouch after engaging said connector and said dispensing means.

8. In a disposable liquid storage and dispensing device, the combination comprising envelope means formed of flexible thermoplastic sheet material and providing two adjoining storage pouches, said pouches being separated by a wall of said sheet material, a liquid partially filling one of said compartments and sealed therein, detached dispensing means contained within the other of said compartments and sealed therein, said dispensing means having a dispensing end and a socket-providing end, and a passage-providing connector contained within said liquid storage pouch, one end portion of said connector being pointed and dimensioned to be snugly received in said dispensing means socket end, both said dispensing means and said connector being manually manipulable without breaking the seals of said pouches to positions adjoining said wall, and said connector pointed end being capable of being forced through said wall to form an opening therein and to engage said dispensing means socket end without breaking the seals of said pouches, said envelope means, including said wall, being formed of an integral piece of said sheet material, said piece of sheet material being folded upon itself in an M-shaped cross section so that the legs of said M provide the outer sides of said envelope and the V-shaped center portion provides said wall, said outer walls being heat-sealed together around the outer edges thereof to complete the enclosure of said pouches.

9. The combination of claim 8 wherein there is also provided slitter means for opening the pouch containing said dispensing means after said dispensing means and connector have been assembled.

References Cited by the Examiner

UNITED STATES PATENTS

| 1,465,617 | 8/1923 | Shatz | 222—81 |
| 1,469,739 | 10/1923 | Turner | 222—81 |
| 2,628,911 | 2/1953 | Horan | 99—171 |
| 2,628,912 | 2/1953 | Horan | 99—171 |
| 2,807,384 | 9/1957 | Lipari | 215—11 |
| 3,115,980 | 12/1963 | De Woskin | 215—11 |

FOREIGN PATENTS 1,042,837  11/1958  Germany.

LOUIS J. DEMBO, *Primary Examiner.*

RAPHAEL M. LUPO, W. SOBIN, *Examiners.*